United States Patent [19]
Tsipilis

[11] 3,845,802
[45] Nov. 5, 1974

[54] EMERGENCY TRACTION DEVICE FOR A VEHICLE WHEEL

[76] Inventor: Stergios Tsipilis, 83 Ashland Ave., West Orange, N.J.

[22] Filed: Mar. 6, 1972

[21] Appl. No.: 214,612

[52] U.S. Cl. ............................................. 152/233
[51] Int. Cl. ........................................... B60c 27/62
[58] Field of Search ............................. 152/233, 243

[56] References Cited
UNITED STATES PATENTS

| | | | |
|---|---|---|---|
| 1,439,553 | 12/1922 | Johnston | 152/233 |
| 2,014,151 | 9/1935 | Stuller | 152/233 |
| 2,453,426 | 11/1948 | Freed | 152/233 |
| 2,461,737 | 2/1949 | Huffman et al. | 152/233 |

*Primary Examiner*—James B. Marbert

[57] ABSTRACT

A traction device comprises a traction member and interconnecting links which are detachably wrapped about a wheel in an inelastic and loosely interlocked loop. A coil spring is connected to the loop and the wheel to draw the links taut against each other and the traction member taut against the wheel.

2 Claims, 3 Drawing Figures

EMERGENCY TRACTION DEVICE FOR A VEHICLE WHEEL

BACKGROUND OF THE INVENTION

The present invention relates to traction devices for attachment to vehicle wheels.

Heretofore wheel traction devices included flexible straps or the like which are secured to a traction member such as chains. A vehicle operator in using such devices in emergency conditions is required to get under the vehicle and thread the straps through the wheel, pull the strap taut, and attempt to lock the device in the taut condition. This arrangement has not always proved to be satisfactory due to adverse weather conditions which detract from the operator's ability to securely and tightly fasten the device. Additionally the strap members, being made of woven material or the like, may deteriorate under extensive use and may break causing the device to damage the vehicle when in use.

Other devices use spring tension members in the traction member loop to resiliently secure the traction device to the wheel wherein the remainder of loop are joined by stiff members. However, these arrangements have met with little success in that the spring members are subjected to severe forces when the device is in use. These forces tend to break the spring member or otherwise cause the traction device to provide less than optimum performance by stretching and yielding the spring member, therefore loosening the traction device about the wheel.

SUMMARY OF THE INVENTION

In accordance with the present invention, an emergency traction device for use on a vehicle wheel comprises a traction member exhibiting negligible strain when stressed in tension and traction member locking means exhibiting negligible strain when stressed in tension connected to the traction member for locking the traction member to the wheel. The locking means includes a rigid interlocking member interlocked to the ends of the traction member and interlocking means secured thereto for detachably interlocking the interlocking member to the other end of the traction member so as to loosely detachably lock the traction member to the wheel in a loose closed loop formed with the traction member. Resilient slack removing means are secured to the locking means and adapted to be detachably secured to the wheel for drawing the locking means taut against the traction member and the traction member taut against the wheel.

IN THE DRAWINGS

DETAILED DESCRIPTION

Figures 1, 2:
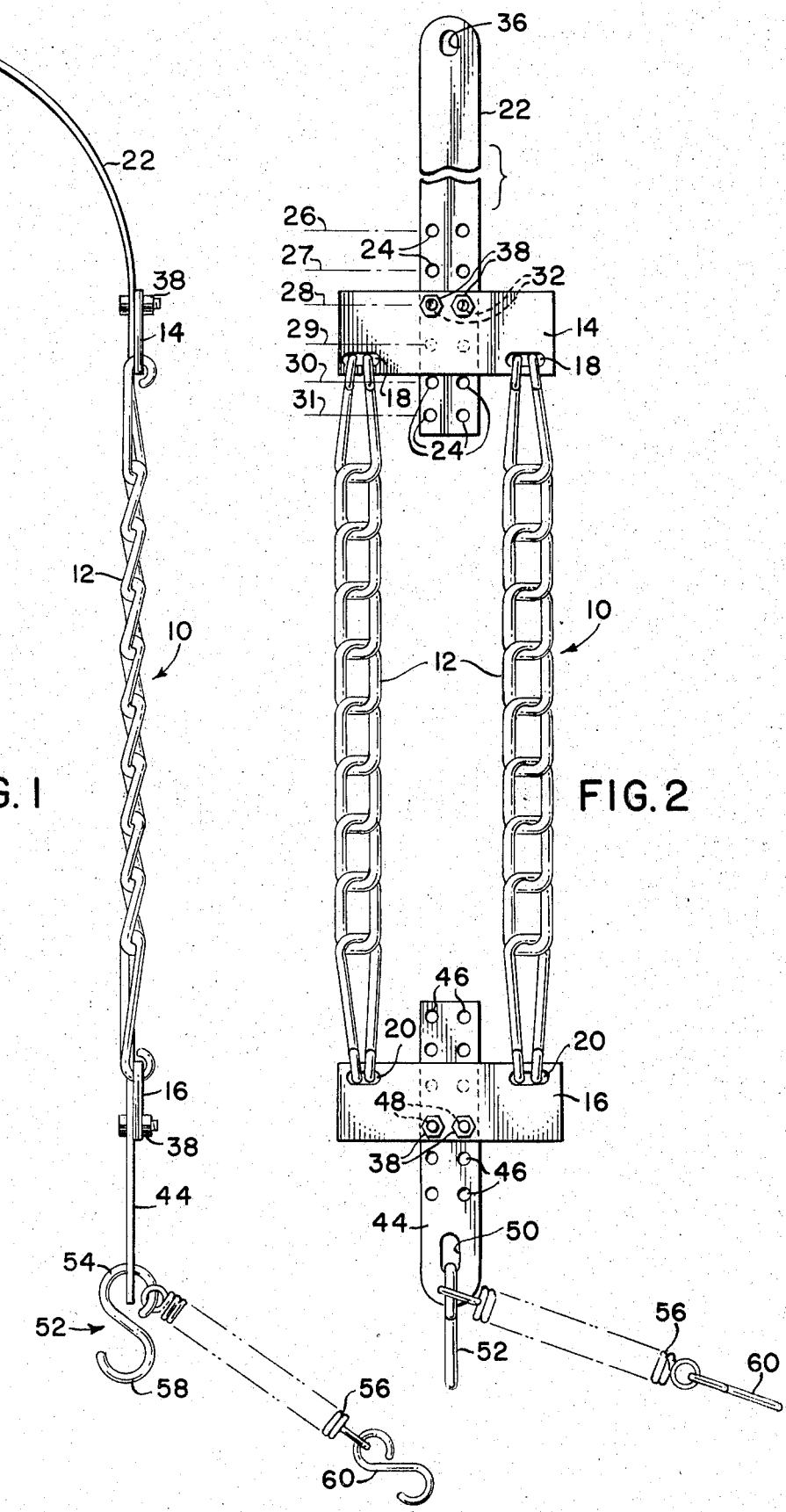
FIG. 1 is a side elevation view of an embodiment of a device constructed in accordance with the present invention.
FIG. 2 is a front elevation view of the embodiment of FIG. 1.

In FIGS. 1 and 2, traction device 10 comprises a pair of traction chains or cleats 12 having one end thereof connected to tie bar 14 and the other end thereof connected to tie bar 16 as best seen in FIG. 2. Chains 12 are connected to tie bars 14 and 16 in a conventional manner by hooking the ends thereof through corresponding apertures 18 and 20 disposed in the tie bars 14 and 16, respectively, as shown. Tie bars 14 and 16 are preferably flat steel plates of suitable thickness to rigidly space the ends of the chains as shown.

The device constructed in accordance with the present invention includes an elongated extension strap 22 having a plurality of spaced apertures 24 arranged in rows 26 – 31 inclusive. Preferably two apertures 24 are disposed in each of the rows 26 – 31. A second plurality of apertures 32 are disposed in tie bar 14 spaced in substantial alignment with the apertures 24 in any of rows 26 – 31. At the extended end of strap 22, there is disposed an elongated hole 36. Strap 22 is preferably made of a stiff sheet metal that is hand deformable but which is sufficiently stiff to remain in the deformed position. Strap 22 is rigidly secured to ite bar 14 by way of aligned apertures 24 and 32 and a suitable fastener such as bolt and nut assembly 38. Of course, other suitable fasteners may be used as well.

By aligning certain ones of apertures 24 with holes 32, the length of the extended strap may be set so as to adjustably secure traction member 10 to a vehicle wheel, as will be described. Strap 22 is sized so as to fit through opening 40 (FIG. 3) disposed in a conventional wheel rim 42.

Connected to tie bar 16 is a second strap 44 made of suitable sheet steel, or the like, rigidly secured to the tie bar by way of aligned apertures 46 in strap 44 and apertures 48 in tie bar 16, in a manner similar to the apertures 24 and 32 described above with respect to tie bar 14 and strap 22. As a result, strap 44 is adjustably set along its length with respect to tie bar 16. Suitable fastening devices such as bolts or nuts 38 securely fasten strap 44 to tie bar 16 by way of aligned apertures 46 and 48. Disposed at the extended end of strap 44 is an elongated aperture 50.

Interlocked with aperture 50 and strap 44 is a rigid interlocking hook member 52 which is generally S-shaped as shown. The bight 54 of hook member 52 at one end thereof is securely interlocked with strap 44. In addition, bight 54 is also securely interlocked with one end of a resilient tension member such as coil spring 56. The other bight 58 on hook member 52 is formed into a partially opened hook as shown. Hook mmeber 52 is a rigid device formed of heavy gauge wire steel capable of withstanding the anticipated tensile stresses when traction device 10 is in use, exhibiting negligible strain when stressed. The traction device comprising strap 22, tie bar 14, chains 12, tie bar 16, hook member 52 and strap 44 are provided in accordance with the present invention as an inelastic assembly capable of withstanding high tensile stresses with negligible elongation.

Connected to the other end of coil spring 56 is a second hook member 60, shaped similarly as member 52. One end of hook member 60 is interlocked with spring 56. The other end of member 60 forms a hook for detachably attaching to rim 42 (FIG. 3) or a second like device 10 disposed on the vehicle wheel as will be described.

Bight 58 of member 52 serves to interconnect with strap 22 by way of hole 36. It will now be appreciated that the entire assembly, when hook member 52 is releasably interlocked with strap 22, forms an inelastic loop configuration, comprising strap 22, tie bar 14, chains 12, tie bar 16, strap 44 and hook member 52.

Figure 3:
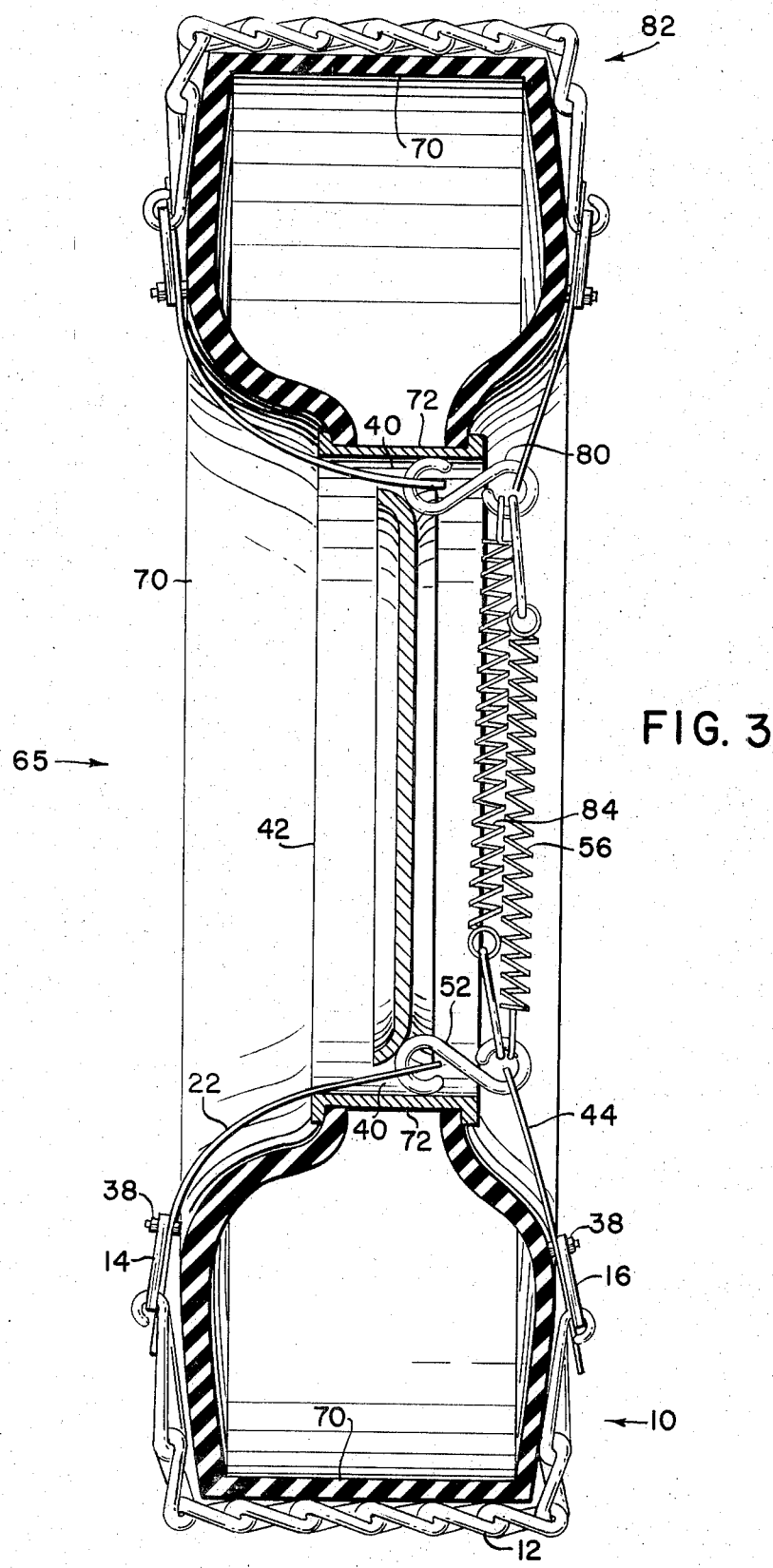
FIG. 3 is a sectional view through a vehicle wheel illustrating the device of FIG. 1 attached thereto.

As best seen in FIG. 3, traction device 10 is assembled to a wheel 65 comprising a rim 42 and a tire 70 assembled to rim 42 in a conventional manner. Strap 2 and strap 44 are adjusted on tie bars 14 and 16, respectively, in accordance with the length of the periphery formed by the tire-retaining portion 72 of rim 42 and the assembled tire 70 in section. This is accomplished by removing bolt and nut assemblies 38 and aligning suitable ones of the apertures 24 and 46 in the straps 22 and 44 with respective apertures 32 in tie bars 14 and 16, respectively, as described above.

Strap 22 is conveniently bent around the tire and tire-retaining portion 72 and slipped through aperture 40 such that hole 36 is disposed on the other side of rim 42. The hook portion of hook member 52 formed by bight 58 is then slipped through hole 36 such that member 52 forms a rigid interlocking link between straps 22 and 44. It should be understood that to perform the operation of connecting member 52 to strap 22 a small amount of slack is present between the traction device 10 and the combined rim and tire assembly, about which the traction device is wrapped. This slack permits rapid assembly and disassembly of the traction device to the wheel. Once interlocked to the wheel, the traction device provides high tensile strength and therefore withstands any tensile stresses imposed thereon during use with negligible elongation. This provides an exceptionally strong traction device.

As the wheel rotates, the slack in traction loop of traction device 10 will cause the traction device to slap around on the wheel. To prevent this, spring 56 is hooked in tension to a portion of the wheel, such as through aperture 40 to rim 42 or preferably to a second hook member 80, which forms a rigid interconnecting link in a second traction member 82, which is substantially the same as traction device 10 and which is assembled to wheel 65 diametrically opposite to traction device 10.

A second coil spring 84, securely interlocked to hook member 80, is hooked to bight 54 on member 52. As a result, two coil springs 56 and 84 are provided, which resiliently draw hook member 52 taut against straps 22 and 44 and chains 12 taut against tire 70. This prevents any slap between the traction device 10 or traction device 82 and wheel 65. A further description of traction device 82 will not be provided as it is substantially the same in construction as traction member 10.

While two springs 56 and 84 are shown when two traction devices 10 and 82 are employed, it should be understood that a single heavy-duty coil spring may be substituted in their place. However, the use of two coil springs permits lighter springs to be employed providing additional convenience in assembly and disassembly.

While both straps 22 and 44 are shown adjustable to the respective tie bars 14 and 16, in certain applications in practice only one of the straps need be adjustable.

It will now be appreciated that a traction device has been described, including a traction member, tie bars, adjustable straps secured to the tie bars and a rigid interconnecting link form a loose traction loop detachably secured to a vehicle wheel. By providing an inelastic traction loop in the assembled device, a strong and therefore safe traction device is provided. By resiliently drawing taut the traction loop portion of the device, any looseness in the assembly thereof is substantially eliminated.

I claim:

1. An emergency traction device attachable to a vehicle wheel including hook receiving means, comprising:

a pair of chain-like traction members,
a first stiff, metal cross bar secured to one end of said traction members,
a second stiff, metal cross bar secured to the other end of said traction members,
a first elongated deformable stiff metal connecting strap adjustably secured at one end thereof to said first cross bar,
a rigid metal hook member having a hook at one end interlocked at the other end thereof directly to said second cross bar,
hook receiving means disposed in the other end of said connecting strap for receiving said hook member one end,
said traction members, first and second cross bar, connecting strap, and said hook member solely forming a traction loop exhibiting negligible strain when stressed below the yield point thereof and a loose closed loop about said wheel when said hook is engaged with said hook receiving means in said connecting strap, and resilient means secured to said rigid hook member and including a wheel hook for engaging said wheel hook receiving means, said resilient means drawing said hook member, said connecting strap, said cross bars and said traction members taut about said wheel when said device is attached to said wheel to remove any slack otherwise present in said traction loop.

2. The device of claim 1 wherein said second cross bar includes a second elongated connecting strap made of stiff metal, said rigid metal hook being interlocked directly to said second strap.

* * * * *